United States Patent
Wang

(10) Patent No.: US 10,915,425 B2
(45) Date of Patent: Feb. 9, 2021

(54) AUTOMATED PERFORMANCE DEBUGGING OF PRODUCTION APPLICATIONS

(71) Applicant: Microsoft Technology Licensing, LLC, Redmond, WA (US)

(72) Inventor: Yawei Wang, Shanghai (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/326,217

(22) PCT Filed: Sep. 9, 2016

(86) PCT No.: PCT/CN2016/098516
§ 371 (c)(1),
(2) Date: Feb. 17, 2019

(87) PCT Pub. No.: WO2018/045545
PCT Pub. Date: Mar. 15, 2018

(65) Prior Publication Data
US 2019/0196937 A1    Jun. 27, 2019

(51) Int. Cl.
*G06F 11/36* (2006.01)
*H04L 12/26* (2006.01)
(Continued)

(52) U.S. Cl.
CPC ...... *G06F 11/3612* (2013.01); *G06F 11/3017* (2013.01); *G06F 11/3428* (2013.01);
(Continued)

(58) Field of Classification Search
None
See application file for complete search history.

(56) References Cited

U.S. PATENT DOCUMENTS

| 7,143,392 B2 | 11/2006 | Li et al. |
| 7,643,982 B2 | 1/2010 | Sanjar et al. |

(Continued)

FOREIGN PATENT DOCUMENTS

| CN | 102624879 A | 8/2012 |
| CN | 102685180 A | 9/2012 |

(Continued)

OTHER PUBLICATIONS

Supinski, et al., "Lightweight and Statistical Techniques for Petascale Debugging: Correctness on Petascale Systems (CoPS) Preliminry Report", In Preliminry Report No. LLNL-SR-499454, Sep. 16, 2011, pp. 1-28.

(Continued)

*Primary Examiner* — Philip Wang
(74) *Attorney, Agent, or Firm* — Rainier Patents, P.S.

(57) ABSTRACT

Performance anomalies in production applications can be analyzed to determine the dynamic behavior over time of hosting processes on the same or different computers. Problematic call sites (call sites that are performance bottlenecks or that are causing hangs) can be identified. Instead of relying on static code analysis and development phase load testing to identify a performance bottleneck or application hang, a lightweight sampling strategy collects predicates representing key performance data in production scenarios. Performance predicates provide information about the subject (e.g., what the performance issue is, what caused the performance issue, etc.). The data can be fed into a model based on a decision tree to identify critical threads running the problematic call sites. The results along with the key performance data can be used to build a call graph prefix binary tree for analyzing call stack patterns. Data collection, analysis and visualizations of result can be performed.

20 Claims, 13 Drawing Sheets

(51) Int. Cl.
*G06F 11/30* (2006.01)
*G06F 11/34* (2006.01)
*G06F 11/07* (2006.01)

(52) U.S. Cl.
CPC ...... *G06F 11/3447* (2013.01); *G06F 11/3476* (2013.01); *G06F 11/3636* (2013.01); *H04L 43/00* (2013.01); *H04L 43/022* (2013.01); *H04L 43/04* (2013.01); *H04L 43/0817* (2013.01); *G06F 11/0778* (2013.01)

(56) References Cited

U.S. PATENT DOCUMENTS

| | | | |
|---|---|---|---|
| 7,827,535 | B2 | 11/2010 | Maron |
| 8,086,910 | B1* | 12/2011 | Koktan ............... G06F 11/0757 714/52 |
| 8,336,033 | B2* | 12/2012 | Schmelter ........... G06F 11/3636 717/127 |
| 8,584,098 | B2* | 11/2013 | Schmelter ........... G06F 11/3404 717/130 |
| 8,627,317 | B2* | 1/2014 | Altman ............... G06F 11/3419 718/100 |
| 8,694,519 | B2 | 4/2014 | Fein et al. |
| 8,756,586 | B2 | 6/2014 | Khanapurkar et al. |
| 8,839,209 | B2 | 9/2014 | Gallagher et al. |
| 9,077,610 | B2* | 7/2015 | Bansal .................. H04L 43/022 |
| 9,274,919 | B2 | 3/2016 | Greifeneder et al. |
| 2010/0017584 | A1* | 1/2010 | Jones .................. G06F 11/3612 712/227 |
| 2010/0107014 | A1 | 4/2010 | Shochat et al. |
| 2010/0153927 | A1 | 6/2010 | Stall et al. |
| 2010/0174946 | A1* | 7/2010 | Burdick ................ G06F 9/3851 714/38.14 |
| 2011/0016357 | A1 | 1/2011 | Tsvetkov |
| 2015/0143344 | A1* | 5/2015 | Davis ...................... G06F 8/751 717/129 |
| 2018/0027291 | A1* | 1/2018 | Chen ..................... H04W 12/10 709/224 |

FOREIGN PATENT DOCUMENTS

| | | |
|---|---|---|
| CN | 102789702 A | 11/2012 |
| CN | 102857560 A | 1/2013 |
| WO | 200193043 A1 | 12/2001 |

OTHER PUBLICATIONS

Parsons, Trevor, "Automatic Detection of Performance Design and Deployment Antipatterns in Component Based Enterprise Systems", In PhD Thesis of University College Dublin, Nov. 2007, 192 pages.

Bachwani, Rekha, "Preventing and Diagnosing Software Upgrade Failures", In Doctoral Dissertation of the State University of New Jersey, Jan. 2012, 86 pages.

Arulraj, et al., "Production-run software failure diagnosis via hardware performance counters", In Proceedings of the eighteenth international conference on Architectural support for programming languages and operating systems, Mar. 16, 2013, pp. 101-112.

Krakostas, et al., "Model-Driven Engineering of Composite Service Oriented Application", In International Journal of Information Technologies and Systems Approach, vol. 4, Issue 1, Jan. 23, 2011, pp. 23-37.

Liu, et al., "Automatic performance debugging of SPMD-style parallel programs", In Journal of Parallel and Distributed Computing, vol. 71, Issue 7, Jul. 2011, pp. 1-16.

Wang et al., "Hang Analysis: Fighting Responsiveness Bugs", In Proceedings of the 3rd ACM SIGOPS/EuroSys European Conference on Computer Systems, Apr. 1, 2008, pp. 177-190.

Jin, et al., "Instrumentation and Sampling Strategies for Cooperative Concurrency Bug Isolation", In Proceedings of the ACM international conference on Object oriented programming systems languages and applications, Oct. 17, 2010, pp. 241-255.

Engler, et al., "RacerX: effective, static detection of race conditions and deadlocks", In Proceedings of the nineteenth ACM symposium on Operating systems principles, Oct. 19, 2003, pp. 237-252.

Cook, et al., "Termination proofs for systems code", In Proceedings of the 27th ACM SIGPLAN Conference on Programming Language Design and Implementation, Jun. 10, 2006, pp. 415-426.

Cook, et al., "Proving thread termination", In Proceedings of the 28th ACM SIGPLAN Conference on Programming Language Design and Implementation, Jun. 11, 2007, pp. 320-330.

Reiss, Steven P., "Controlled Dynamic Performance Analysis", In Proceedings of the 7th international workshop on Software and performance, Jun. 24, 2008, pp. 43-54.

Mellor-Crummey, et al., "HPCVIEW: A Tool for Top-down Analysis of Node Performance", In Journal of Supercomputing, vol. 23, Issue 1, Aug. 2002, pp. 1-20.

Simmons, et al., "Performance Instrumentation and Visualization", In Publication of ACM Press, Jan. 1990, 18 pages.

Tiwari, et al., "A Scalable Auto-tuning Framework for Compiler Optimization", In Proceedings of the IEEE International Symposium on Parallel & Distributed Processing, May 23, 2009, 12 pages.

Uh, et al., "Analyzing Dynamic Binary Instrumentation Overhead", In Journal of WBIA Workshop at Architectural support for programming languages and operating systems, Oct. 2006, 8 pages.

Aguilera, et al., "Performance Debugging for Distributed Systems of Black Boxes", In Proceedings of the nineteenth ACM symposium on Operating systems principles, Oct. 19, 2003, 16 pages.

Arnold, et al. "Stack Trace Analysis for Large Scale Debugging", In Proceedings of IEEE International Parallel and Distributed Processing Symposium, Mar. 26, 2007, pp. 1-15.

PCT Application No. PCT/CN2016/098516, International Search Report, dated Jun. 12, 2017, 4 pages.

Khoonsari, et al., "A Comparison of Efficiency and Robustness of ID3 and C4.5 Algorithms Using Dynamic Test and Training Data Sets", In International Journal of Machine Learning and Computing, vol. 2, No. 5, Oct. 2012, pp. 540-543.

Han, et al., "Performance Debugging in the Large via Mining Millions of Stack Traces", In Proceedings of the 34th International Conference on Software Engineering, Jun. 2, 2012, pp. 145-155.

Ristad, et al., "Learning string-edit distance", In Journal of IEEE Transactions on Pattern Analysis and Machine Intelligence, vol. 20, Issue 5, May, 1998, pp. 522-532.

"NetNamedPipeBinding Class", Retrieved on: Jul. 5, 2016 Available at: https://msdn.microsoft.com/en-us/library/system.servicemodel.netnamedpipebinding(v=vs.110).aspx, 7 pages.

"Model—view—presenter", Retrieved on: Jul. 5, 2016 Available at: https://en.wikipedia.org/wiki/Model%E2%80%93view%E2%80%93presenter, 4 pages.

"Solid (object-oriented design)", Retrieved on: Jul. 5, 2016 Avaliable at: http://en.wikipedia.org/wiki/SOLID_(object-oriented_design), 2 pages.

"ChannelFactory<TChannel> Class", Retrieved on: Jul. 5, 2016 Available at: http://msdn.microsoft.com/en-us/library/ms576132(v=vs.110).aspx, 9 pages.

"!kuser", Retrieved on: Jul. 5, 2016 Available at: http://msdn.microsoft.com/en-us/library/windows/hardware/ff563942(v=vs.85).aspx, 1 page.

Crandall, et al., "Temporal Search: Detecting Hidden Malware Timebombs with Virtual Machines", In Proceedings of Twelfth International Conference on Architectural Support for Programming Languages and Operating Systems, Oct. 21, 2006, 12 pages.

"Troubleshooting Low CPU Hangs with a Debugger", Retrieved on: Jul. 5, 2016 Available at: https://technet.microsoft.com/en-us/library/cc757297(v=ws.10).aspx, 1 page.

"Troubleshooting High CPU Hangs with a Debugger", Retrieved on: Jul. 5, 2016 Available at: https://technet.microsoft.com/en-us/library/cc757239(v=ws.10).aspx, 1 page.

(56) References Cited

OTHER PUBLICATIONS

Bois, et al., "Criticality Stacks: Identifying Critical Threads in Parallel Programs using Synchronization Behavior", In Proceedings of the 40th Annual International Symposium on Computer Architecture, Jun. 23, 2013, pp. 511-522.
W. Yeung, Raymond, "Information Theory and Network Coding", In Publication of Springer, Jun. 13, 2008, 597 pages.
Kullback, et al., "On Information and Sufficiency", In Journal Annals of Mathematical Statistics, vol. 22, No. 1, Mar. 1951, pp. 79-86.
PCT Application No. PCT/CN2016/098516, Written Opinion of the International Searching Authority, dated Jun. 12, 2017, 4 pages.
Beutel, et al., "Deployment Techniques for Sensor Networks", In International Journal on Sensor Networks, Signals and Communication Technology, Oct. 30, 2009, 29 pages.
Carrozza, Gabriella, "Software Faults Diagnosis in Complex, OTS-based, Critical Systems", In Thesis of "Federico Ii" University of Naples, Nov. 2008, 155 pages.
Quinlan, J. Ross, "C4.5: Programs for Machine Learning", In Publication of Morgan Kaufmann, Jan. 15, 1993, 310 pages.
Kullback, Solomon, "Information theory and statistics", In Journal of Science, vol. 131, Issue 3404, Mar. 25, 1960.
"Extended Search Report Issued in European Patent Application No. 16915480.4", dated Mar. 2, 2020, 9 pages.

\* cited by examiner

System Call Sites
    Framework Call Sites
    ...
    N()
    F()
    ...
    Main()
    Framework Call Sites
6  System Call Sites

---

System Call Sites
    Framework Call Sites
    ...
    N()
    D()
    E()
    ...
    Main()
    Framework Call Sites
7  System Call Sites

---

8  System and Framework Call Sites

---

9  System and Framework Call Sites

---

10  System and Framework Call Sites  ⎬— 273

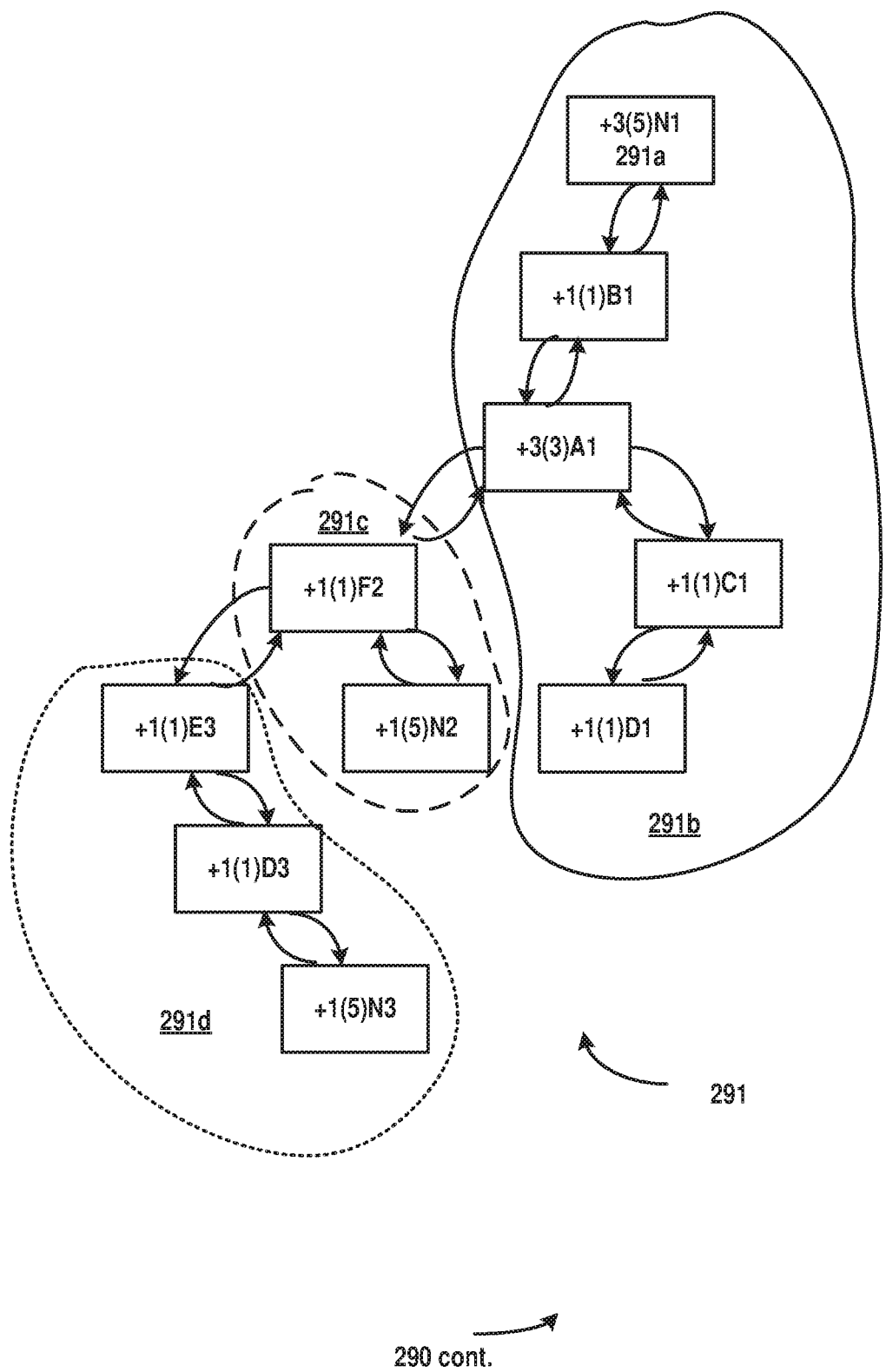

AUTOMATED PERFORMANCE DEBUGGING OF PRODUCTION APPLICATIONS

CROSS REFERENCED TO RELATED APPLICATIONS

Pursuant to 35 U.S.C. § 371, this application is the United States National Stage Application of International Patent Application No. PCT/CN2016/098516, filed on Sep. 9, 2016.

BACKGROUND

Cloud computing is an internet-based on-demand type of computing in which a pool of configurable processing resources including networks, servers, storage, applications, services and so on are shared among many customers. Cloud computing and storage solutions provide users and enterprises with a multitude of capabilities to store and process data in third-party data centers.

Cloud computing has become very popular for various reasons including the availability of high-end computing technology, low cost, good performance, scalability and others. Debugging in a cloud computing environment can be challenging. Should a performance anomaly (e.g., response slowdown) occur, it is often not at all clear what is causing the anomaly.

SUMMARY

Automated performance debugging of customer source code or non-framework code in a production environment can be performed by collecting performance data using a lightweight sampling technique. Performance data is the data that shows how the production application is performing. For example, it can refer to but is not limited to referring to, information about CPU utilization, threads and their call stack traces in a performance debugging context. Framework code is the executable code that serves as an abstraction layer for an operating system to provide generic functionality. Often, framework code can be selectively changed by additional user-written code (code that is not framework code and not operating system code), thus providing application-specific functionality. Framework code generally has libraries, tool sets, and application programming interface (API) support to facilitate development of software applications. Non-framework code (e.g., user-written code) is executable code that a user creates to meet particular functional and/or business requirements. Non-framework code can comprise user-implemented extensions to the framework code.

Performance data can be collected. Performance data can be serialized into storage. The data can be analyzed off-line. The data can be used to identify critical threads. The data can be fed into a decision-tree based model to identify critical threads associated with processing slowdowns. A call graph prefix binary tree can be built to analyze call stack patterns of critical threads to highlight hot spots. A view of wall clock time elapsed on the hot spots can be provided. Through observation of analysis results including the call stack pattern view, the hotspot (code that is causing a performance slowdown) can be identified. In addition to debugging, the information can be used for performance tuning. Performance tuning can improve application performance. The call frame of an identified hotspot can include the module name and method name as well as elapsed clock time of the code associated with the slowdown. Hence static code review can be easily scoped to just reviewing the piece of method code indicated. Hence, the subject matter disclosed herein can be leveraged to tune production application performance.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Overview

Figure 1A:
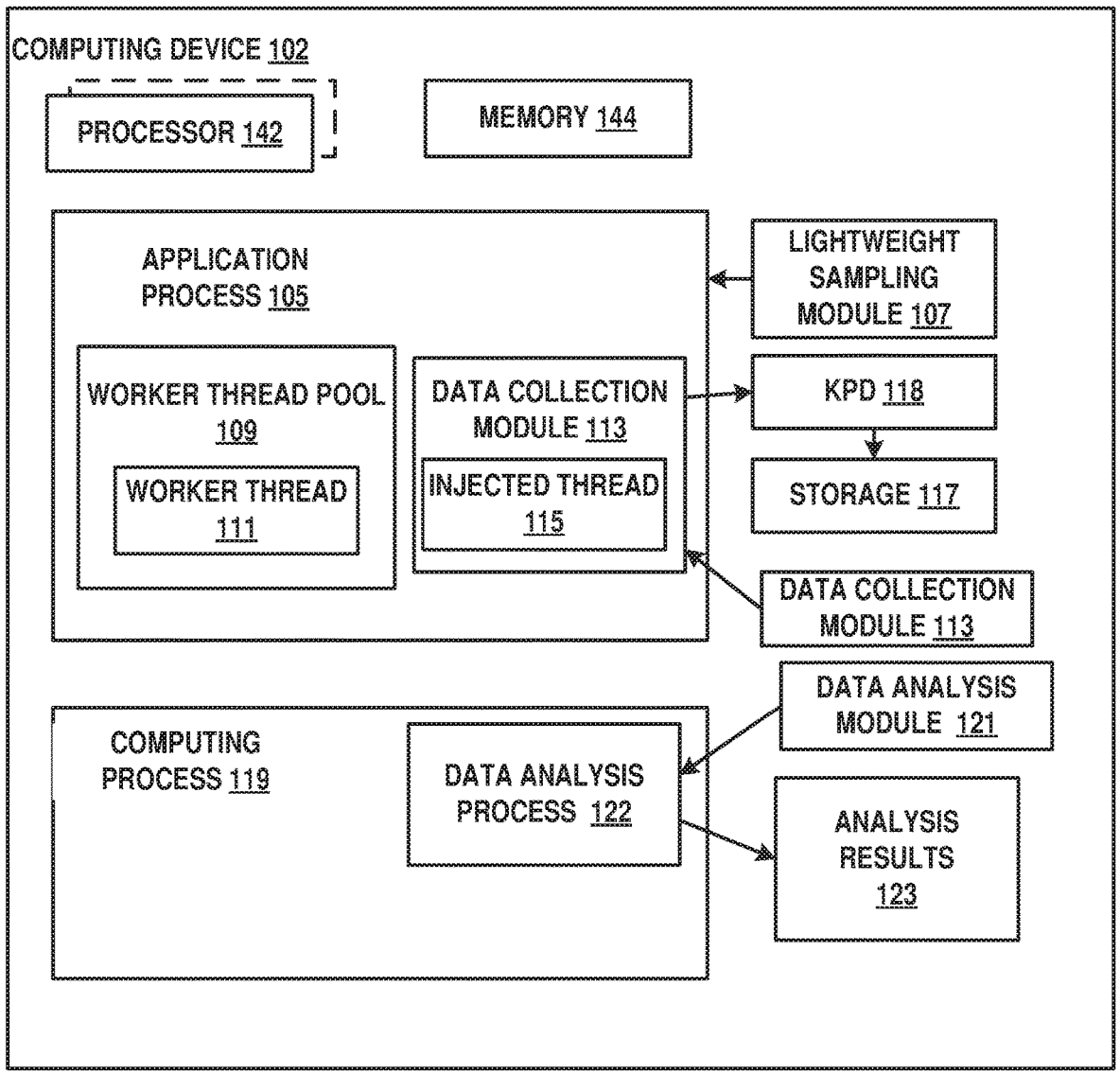
FIG. 1a illustrates a system 100 comprising an example of an automated performance debugging system for production applications in accordance with aspects of the subject matter described herein.

Typically, in cloud computing, applications run across multiple physical tiers and/or over multiple network boundaries. Some systems are complex hybrids of on-premises and cloud systems. Many of the applications support thousands or millions of concurrent user requests. Often they interact with various other systems which may be built with different technologies that can come from different vendors. For example, a hybrid cloud system may begin with requests form thin or thick clients that flow through a cloud service front-end to an on-premises web service to a third party line of business application built on diverse technologies which have data access components interacting with a database layer. Additional services (such as social identity providers, request routing, authentication, authorization and so on) are likely to come into play. Should a performance anomaly (e.g., response slowdown) occur, it is not at all clear which layer is causing the anomaly.

Traditional debugging activities normally involve setting up debugging tools, consecutively capturing several rounds of hang mode dumps during the slowdown and analyzing them using a user mode debugger. A hang mode dump is a full user-mode dump that includes the entire memory space of a process, the program's executable image itself, the handle table, and other information that will be useful to the debugger. A user-mode debugger is a debugger that is used to debug a process running executable code, which is separated from other processes by the OS (operating system). The debugger and the debuggee (the executable being debugged) typically run on the same user mode system. While in-depth debugging using memory dumps is powerful, it is also tedious and time-consuming because hundreds of processes may exist, each of which may have hundreds of threads running within them. Moreover, because a memory dump is a snapshot of a process, a memory dump does not usually provide enough information to be able to deduce the runtime dynamic behavior of the process because a complete profile of the process cannot be assembled. Finally, capturing a hang mode dump for a very large production process can take minutes during which the execution of all threads are suspended (meaning the user's system stops responding).

An application is said to be in a low CPU hang state when the application becomes unresponsive to any request while the process hosting the application is consuming little or no CPU (central processing unit) time. High CPU hang is a type of unresponsiveness in which the process hosting the executable is consuming a great deal of system processor(s) CPU time, (usually near 100%) and the process is slow performing, freezing or even shutting down. The subject matter described herein deals with both low and high CPU hang.

In accordance with aspects of the subject matter described herein, overall performance anomalies for production applications can be identified. The dynamic behavior over time of hosting processes on the same or different computers can be analyzed. Call sites that may be performance bottlenecks or may be causing hangs can be identified. Instead of relying on static code analysis and development phase load testing to identify a performance bottleneck or application hang, a lightweight sampling strategy can collect predicates representing key performance data in production scenarios. Performance predicates can provide information about the subject (e.g., what the performance issue is, what caused the performance issue, etc.). The data can be fed into a model (e.g., such as but not limited to a model based on a decision tree) to identify critical threads running the problematic call sites. The results along with the key performance data can be used to build a call graph prefix binary tree for analyzing call stack patterns. Data collection, analysis and visualizations of results can be performed.

In accordance with aspects of the subject matter described herein, automated performance debugging and tuning can be applied to production applications. One or more of the following features can be included: guarantee limited runtime overhead (as used herein, limited runtime overhead is overhead comprising less than 5% of total overhead for real-life large-scale applications including enterprise server applications). On-the-fly analysis and offline reporting can be performed. Someone who has only basic application and system knowledge can understand what the process is doing during the monitoring period. In accordance with aspects of the subject matter described herein, automated performance debugging can be applied to all processes in a large-scale distributed system simultaneously to identify the causes of overall performance anomaly. In accordance with aspects of the subject matter described herein, automated performance debugging can be applied to applications that run with black boxes. A black box is a component about which users have very little knowledge.

To further elaborate what Key Performance Data is about, suppose a process P's over-time performance metrics is defined as Vector $\vec{P}$, and $\vec{Pi}$ defined as the over-time performance metrics of thread i in process P. Hence:

$$\vec{P} = \Sigma\ \vec{Pi}, i \in \{TID\} \text{ where TID is the collection of all threads' ID}$$

Let sampling duration be x and sampling period be $$y, = \frac{x}{y}.$$

Hence:

$$\vec{P} = <\vec{Ti_0}, \vec{Ti_1}, \ldots, \vec{Ti_N}>$$

$\vec{Ti_N}$ is performance metrics of thread i in sample n. So $$\vec{Ti_N} = <CPUi_n, CallSitei_n>n \in \{0 \ldots N\}$$

where $CPUi_n$ is the user time of thread i in sample n; $CallSitei_n$ are call stack patterns of thread i in sample n. $\vec{Ti_N}$ and $\vec{P}$ are the Key Performance Data.

A lightweight sampling strategy as described herein can be used against a target process to generate Key Performance Data. Choosing an appropriate sampling strategy can be pivotal in achieving the low overhead that production environments typically demand. Traditionally, sampling occurs by invasively attaching a debugger to the process and capturing a hang mode dump or instrumenting the whole application beforehand to emit runtime traces. The lightweight sampling strategy described herein can inject a thread into a target process to collect predicates. First a remote process handle for the target process can be created. The handle can be provided to one or more processes to create an argument buffer and invoke the appropriate code. When the code is invoked, a new thread can be created to collect predicates. The sampling duration and interval (the sampling period) can be specified. A snapshot of all the running threads can be taken.

$CallSitei_n, n \in \{0 \ldots N\}$ can be illustrated as follows. FIG. 2c illustrates an example 250 of a call graph and its corresponding call sites. Suppose for example, an application has a call stack running in thread T where the call stack starts at a process MAIN( ) 251 and finishes at RET( ) 253. Suppose the call site N( ) 252 is the hypothetical performance bottleneck taking 5 seconds to return while the whole execution from MAIN( ) 251 to RET( ) 253 takes 6 seconds. $O^1$ 254 can be the collection of call paths that do not include N( ) 252.

Assume that sampling starts at time 0 and the first sampling that affects N( ) 252 occurs at time 3. A sampling duration of 10 seconds with a 1 second sampling period will result in 11 samples. The dashed lines in the call graph (such as dashed line 255 and dashed line 256) demonstrate there are multiple calls or hoops between the caller and callee. For example, dashed line 255 indicates that indicates that Main( ) 251 calls F( ) 259 more than once. The solid lines (such as solid line 257 and solid line 258) refer to direct caller/callee relationships. For example, line 257 indicates that caller B( ) 260 calls callee N( ) 252 once. Each rectangular box (e.g., box 251a) refers to one call site and the rounded rectangular box 254a refers to the collection of branches in the graph that do not call call site N( ) 252.

Figure 2A:
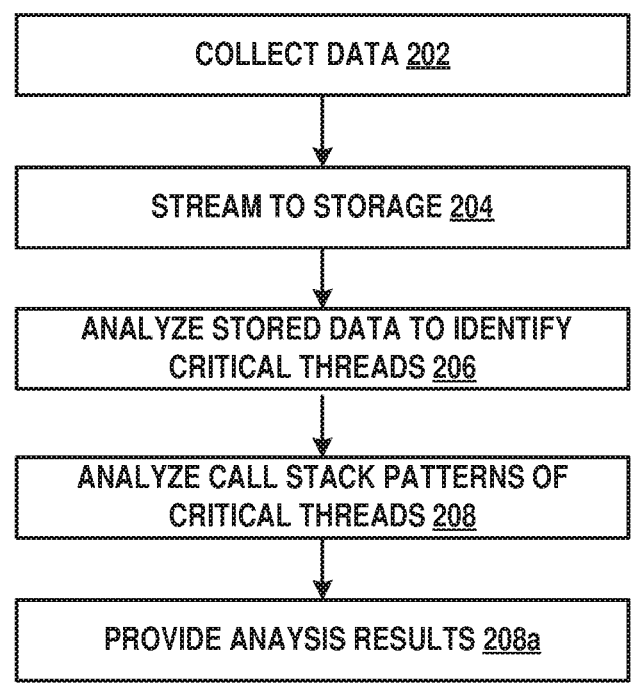
FIG. 2a illustrates an example of a method 200 for performance debugging of production applications in accordance with aspects of the subject matter described herein.
Figure 2A:
Figure 2B:
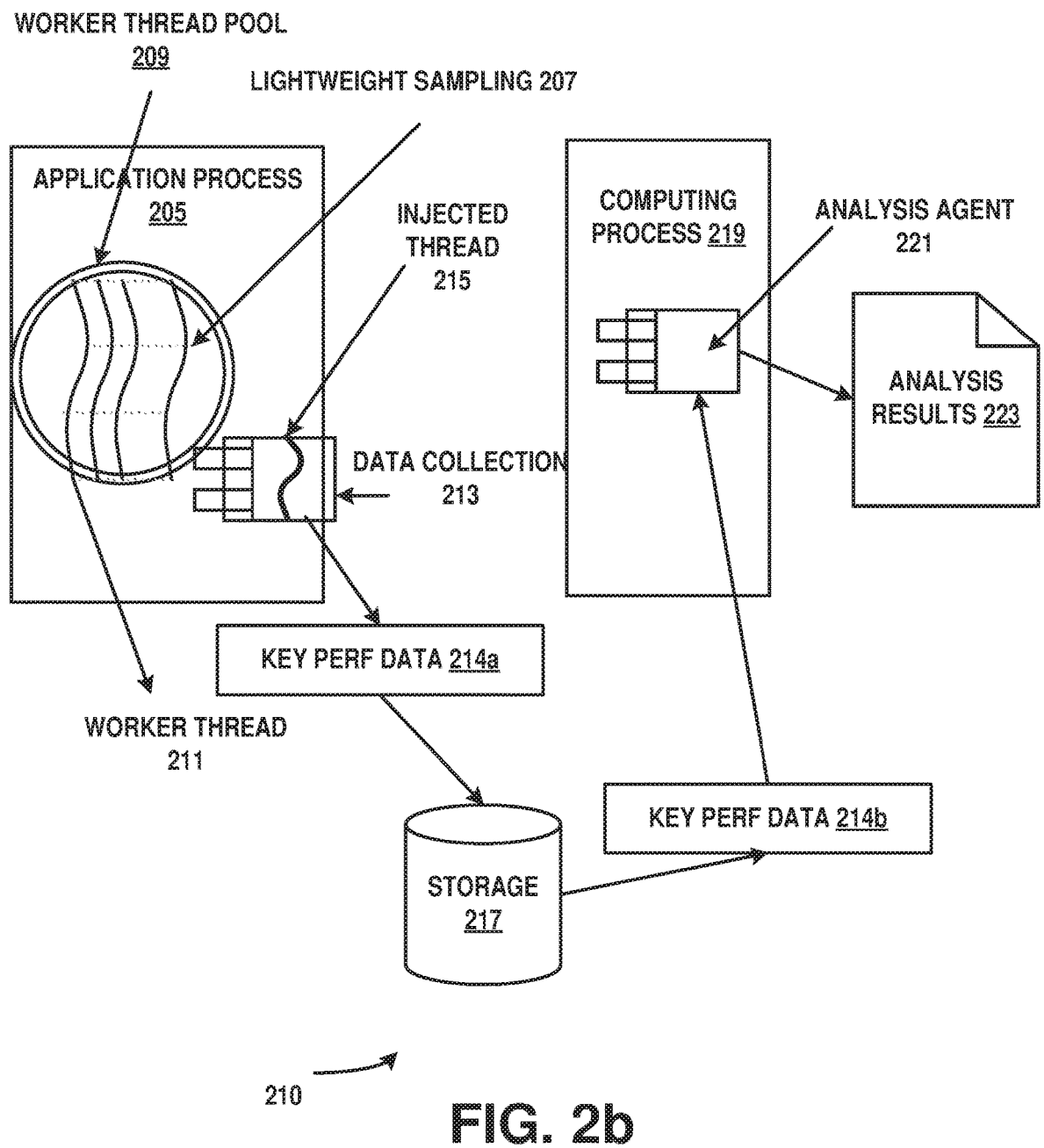
FIG. 2b is a block diagram of performance debugging of production applications in accordance with aspects of the subject matter described herein.
Figure 2C:
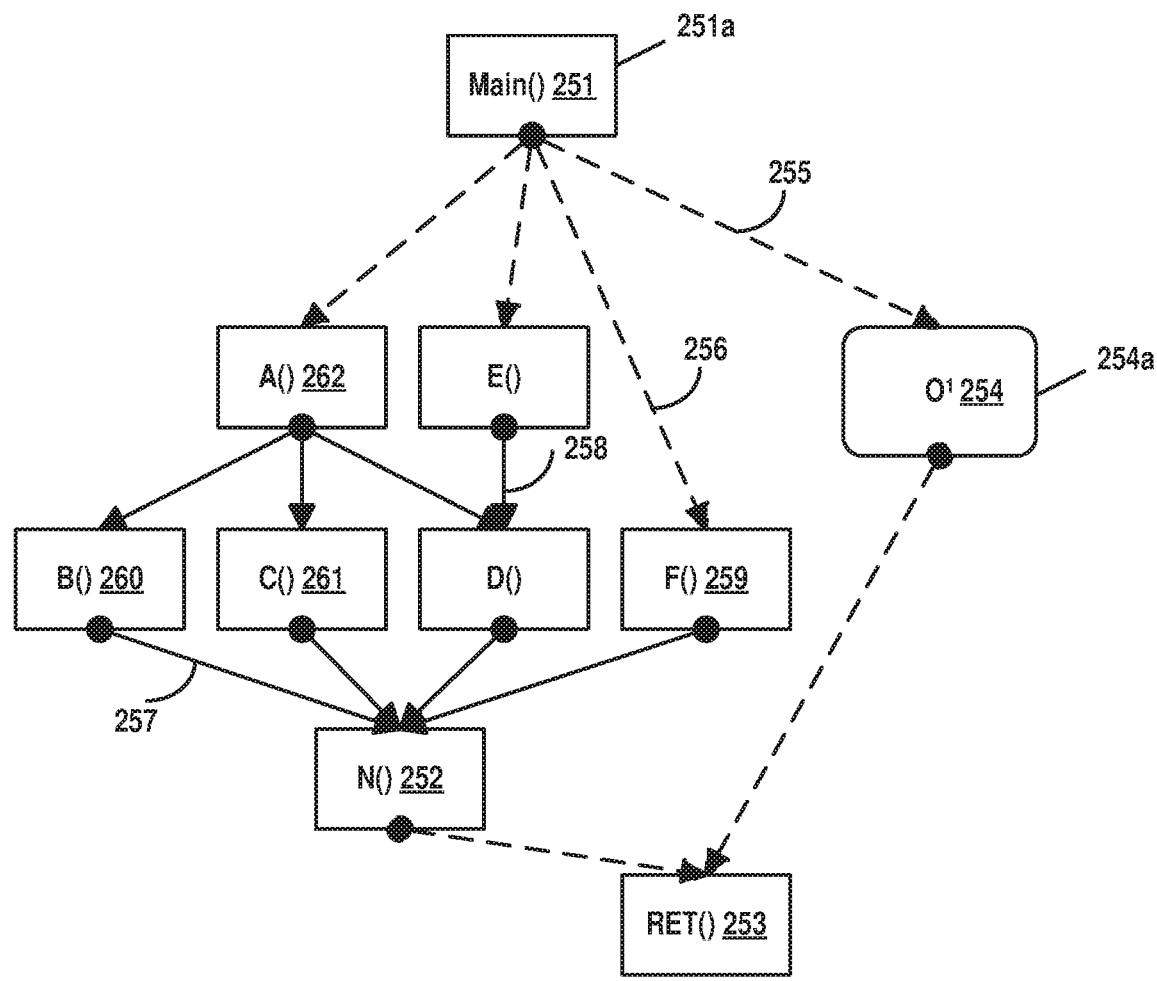
FIG. 2c illustrates a call graph for the program in accordance with aspects of the subject matter described herein.
Figure 2D:
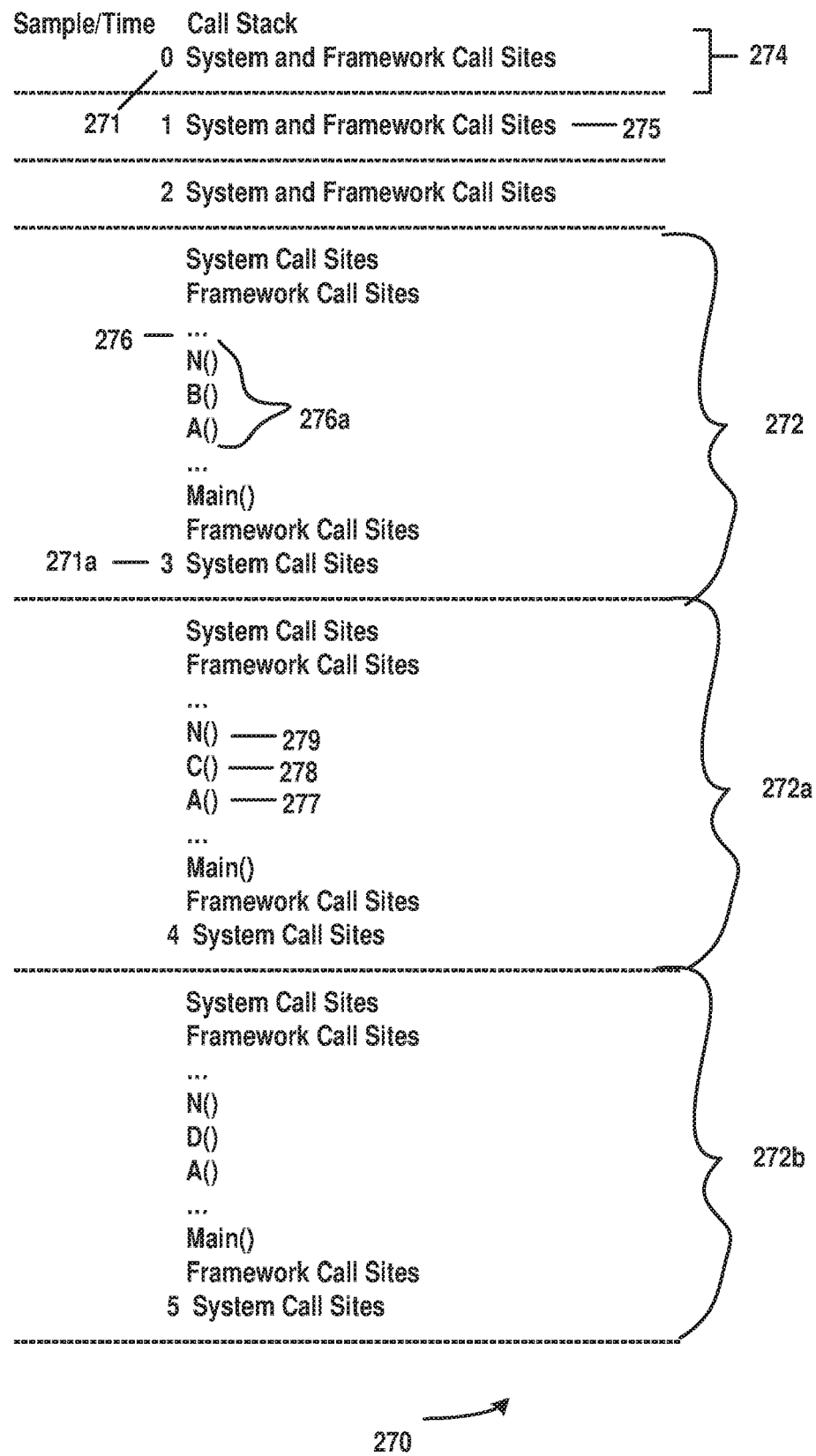
FIG. 2d illustrates an example of a call stack for CallSite$_n$, n∈{0 . . . 11} in accordance with aspects of the subject matter described herein.

FIG. 2d illustrates an example of a call stack 270 (e.g., the call stack for CallSite$_n$, n∈{0 . . . 11}). Suppose sampling starts at time 0 271, as shown in frame 274. At time 3 271a (at the 4th sample, frame 272), the call stack patterns of interest start (e.g., the calls from A( ) 262 to B( ) 260 to N( ) 252 collectively 276a) to appear on the call stack. Each frame in the call stack column reflects a call stack trace captured in a particular sampling of a particular thread. The call stack trace can include multiple frames. The bottom frame, frame 273 is the first call site in the call flow while the top frame 274 is the last. "System and Framework Call Sites" 275 refers to a call to framework code and the ellipses such as ellipsis 276 indicates that there are multiple hoops between two call sites. Hence in frame 272a lines 277, 278 and 279 indicate that A( ) 262 calls C( ) 261 and C( ) 261 calls N( ) 252.

In accordance with aspects of the subject matter described herein, a decision tree or classification tree can be created from an existing set of training cases. The decision tree can be used to classify new cases. Various decision tree construction algorithms can be used including but not limited to the algorithms ID3 and C4.5 by Quinlan. While both these algorithms use formulas based on entropy and information gain, other formulas are contemplated. The decision tree based model can be used to classify a thread as Normal or Critical. A normal thread is unlikely to have call stack information that helps with debugging or problem isolation (i.e., system idle threads). A system idle thread is a thread that is idle (doing nothing). For example, an idle thread can be a thread on which no non-framework executable is running. Such a thread is classified as normal. A critical thread is likely to have information that helps to identify a thread that is causing a performance anomaly (e.g., busy GC (garbage collection thread), busy worker thread, consistently busy threads with the same series of customer call sites).

A ranking of busy threads can be computed. Busy threads can be ranked by CPU usage. Critical threads are classified by a model based on a decision tree. The decision tree model can be constructed based on busy threads ranking, call stack length, the presence of non-framework call sites and the presence of non-framework call sites in consecutive samples. A critical thread can be busy because the thread has a heavy workload because of a problematic call site. A critical thread can be a thread that is not busy because it is waiting for a resource. A critical thread can be a thread that is not busy because it is blocking a resource. The call stack of a critical thread usually starts and ends with the OS or framework and has a non-framework section in the middle, the non-framework section including the possible problematic call sites (e.g., the call sites referenced by reference numerals 276a, 277, 278 and 279). Busy Thread Ranking along with three other attributes, the length of the call stack, "Call Stack Length", the presence of non-framework call sites in the call stack, "Has non-framework call sites" and the presence of non-framework call sites in consecutive samples, "Has non-framework call sites in consecutive samples" can be used in a training set for building the decision tree based model. Busy Thread Ranking reflects the CPU utilization of each busy thread in any time interval(s). The CPU utilization of a busy thread in any time interval(s) can be calculated as follows:

$$\frac{\sum_{n=a}^{b} CPUi_n}{LogicalProcessorNumber * samplingperiod * (b-a)}$$

where $a < b \land a, b \in \{0 \dots N\}$

Figure 2E:
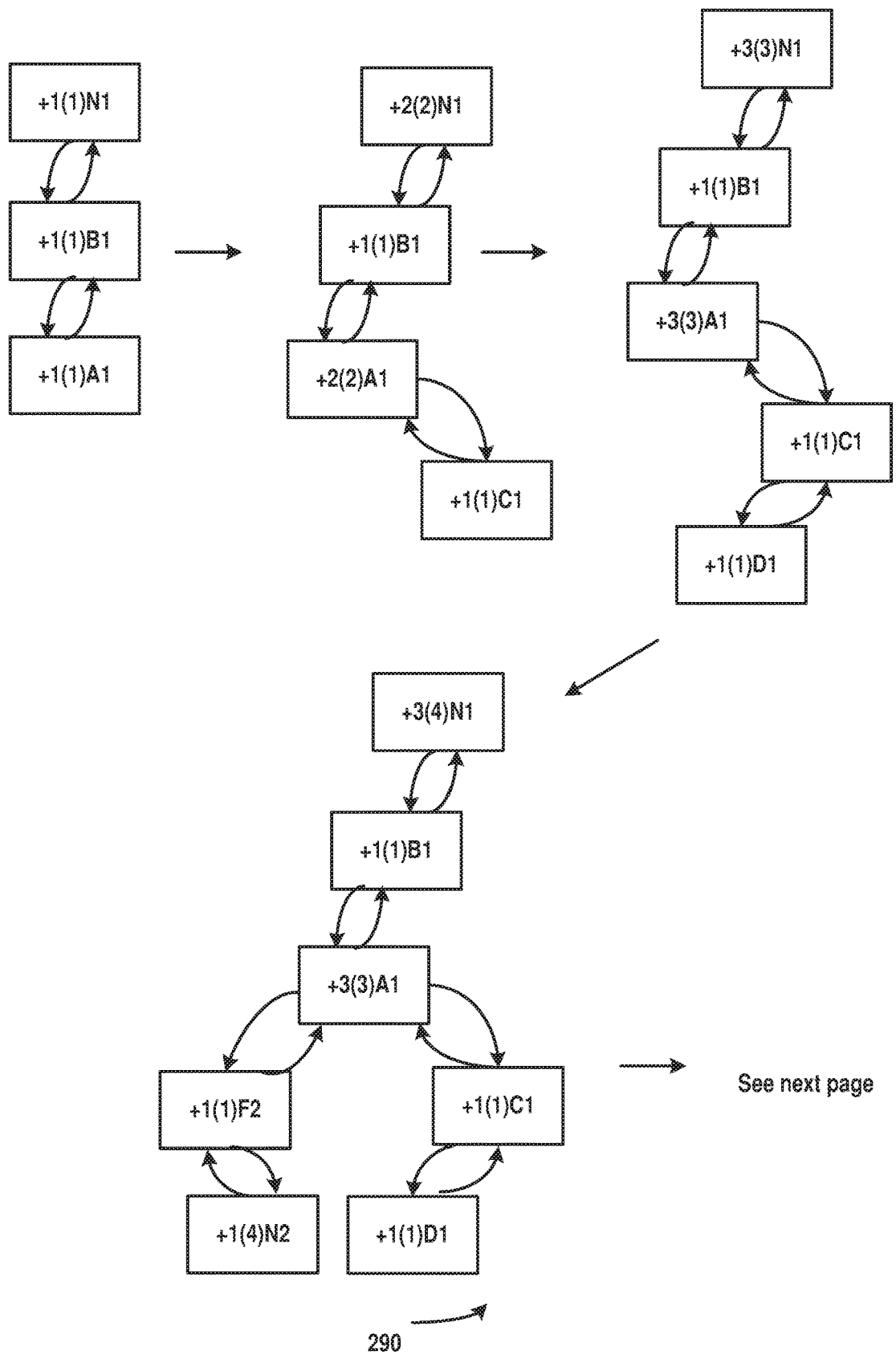
FIG. 2e illustrates an example of building a call graph prefix binary tree in accordance with aspects of the subject matter described herein.

A call graph prefix binary tree can be created that clusters over-time call stacks to highlight hot spots and hot paths. The call graph prefix binary tree can provide a rough view of wall clock time elapsed on the hot spots and/or hot paths. When a new node is added to the call graph prefix binary tree, it is added as a right child of the left most branch of the call graph prefix binary tree. FIG. 2e illustrates an example of building a call graph prefix binary tree 291 for call stack 270 of FIG. 2d. The notation +X (Y) CallSite Z means the CallSite has been hit X times in pattern Z with maximum consecutive hits Y. That is, for example, for the node 291a, +3(5)N1 means that callsite N has been sampled 3 times and appeared in 5 consecutive samples in call stack pattern 1. There are 3 call stack patterns in FIG. 2d, pattern 1 (ADCBN) 291b, pattern 2 (FN) 291c and pattern 3 (EN) 291d. It will be appreciated that although described in the context of a production environment, the subject matter described herein applies equally to a test or other non-production environment.

Automated Performance Debugging of Production Applications

FIG. 1a illustrates a system 100 comprising an example of an automated performance debugging system for production applications in accordance with aspects of the subject matter described herein. All or portions of system 100 may reside on one or more computers or computing devices such as the computers described below with respect to FIG. 3. System 100 or portions thereof may be provided as a stand-alone system or as a plug-in or add-in.

System 100 or portions thereof may include information obtained from a service (e.g., in the cloud) or may operate in a cloud computing environment. A cloud computing environment can be an environment in which computing services are not owned but are provided on demand. For example, information may reside on multiple devices in a networked cloud and/or data can be stored on multiple devices within the cloud. System 100 can be an on-premises automated performance debugging system.

System 100 can include one or more computing devices such as, for example, computing device 102. Contemplated computing devices include but are not limited to desktop computers, tablet computers, laptop computers, notebook computers, personal digital assistants, smart phones, cellular telephones, mobile telephones, sensors, server computers and so on. A computing device such as computing device 102 can include one or more processors such as processor 142, etc., and a memory such as memory 144 that communicates with the one or more processors.

System 100 may include one or more program modules that when loaded into the memory 144 and accessed by the one or more processors such as processor 142, etc., cause the processor to perform the action or actions attributed to the one or more program modules. The processor(s) may be configured to perform the action or actions attributed to the one or more program modules. System 100 may include any one of or any combination of any number of the following: a worker thread pool such as worker thread pool 109 from which a worker thread such as worker thread 111 can be assigned to an application process such as application process 105, a lightweight sampling program module or modules such as lightweight sampling module 107, a data collection program module or modules such as data collection module 113, an injected thread such as injected thread 115 injected into application process 105, a storage device such as storage device or storage 117, a computing process such as computing process 119, a data analysis program module such as data analysis module 121 and/or analysis results such as analysis results 123 generated by data analysis process 122.

A worker thread 111 from a worker thread pool 109 can be injected into a application process 105 executing code of a data collection module 113. A lightweight sampling module 107 can periodically collect data (e.g., key performance data 118) which can be serialized and stored in storage 117. The lightweight sampling module 107 can initiate a thread injection into the application process 105. A data analysis process 122 of a computing process 119 can analyze the data and provide analysis results 123.

Figure 1B:
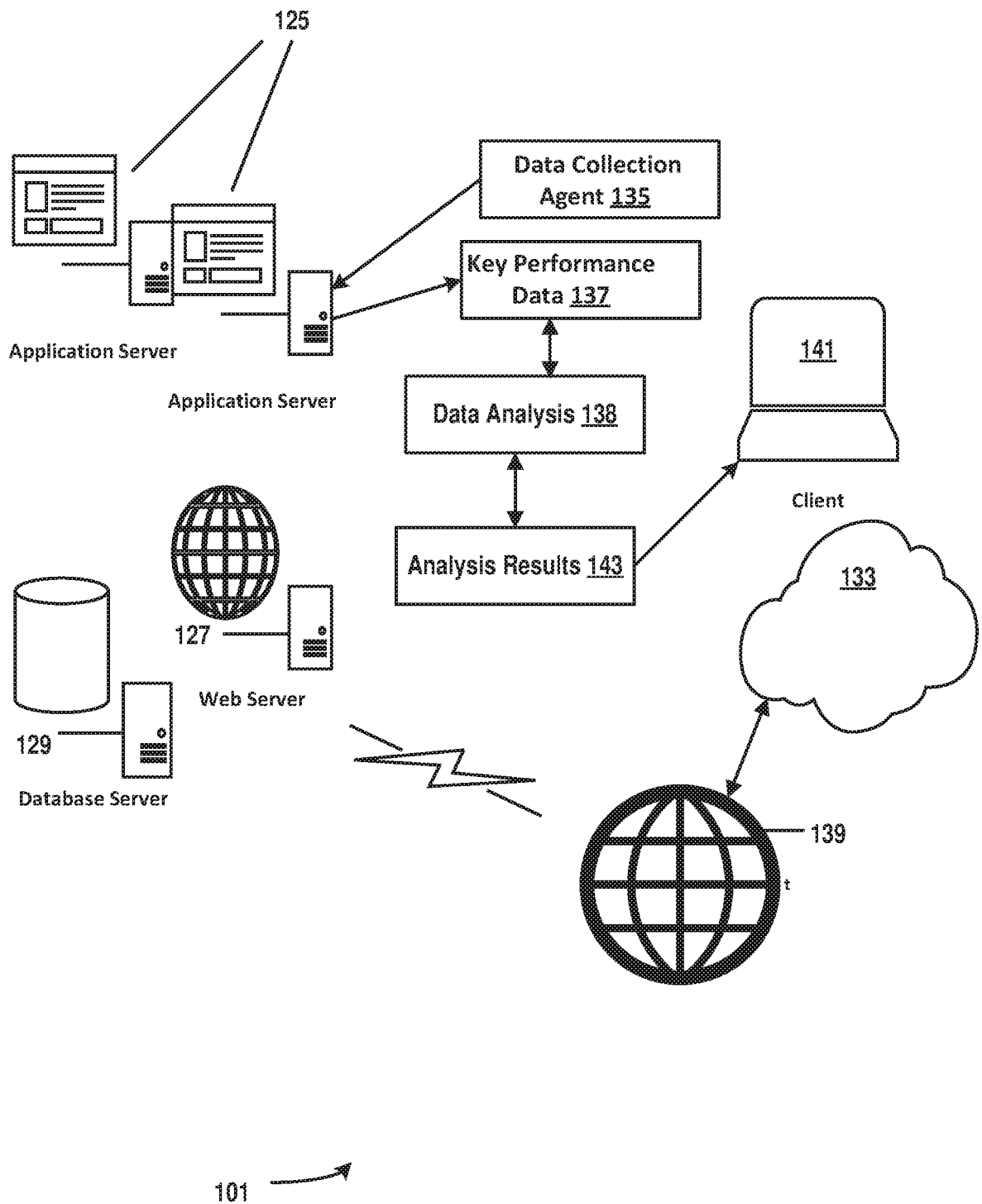
FIG. 1b illustrates another view of a system 101 comprising an example of an automated performance debugging system for production applications in accordance with aspects of the subject matter described herein.

FIG. 1b illustrates a system 101 comprising another example of an automated performance debugging system for production applications in accordance with aspects of the subject matter described herein. All or portions of system 101 may reside on one or more computers or computing devices such as the computers described below with respect to FIG. 3. System 101 or portions thereof may be provided as a stand-alone system or as a plug-in or add-in.

System 101 or portions thereof may include information obtained from a service (e.g., in the cloud) or may operate in a cloud computing environment. A cloud computing environment can be an environment in which computing services are not owned but are provided on demand. For example, information may reside on multiple devices in a networked cloud and/or data can be stored on multiple devices within the cloud.

Contemplated computing devices include but are not limited to desktop computers, tablet computers, laptop computers, notebook computers, personal digital assistants, smart phones, cellular telephones, mobile telephones, sensors, server computers and so on. A computing device such as computing device can include one or more processors and a memory that communicates with the one or more processors.

System 101 can include one or more computing devices such as, for example, computing devices such as one or more application servers 125, one or more web servers 127, one or more database servers 129. The computing devices may comprise a data center. A data collection agent 135 may be downloaded from the cloud 133 via a network such the internet 139. Key performance data such as key performance data 137 can be uploaded to the cloud 133, analyzed by a data analysis component 138 and analysis results 143 can be rendered on a client device 141. Alternatively, a data collection agent 135 can be resident on an on-premises computer. Key performance data 137 may be analyzed by a resident data analysis component and analysis results 143 can be generated on an on-premises device. Any combination of cloud and on-premises components is contemplated.

Figure 1C:
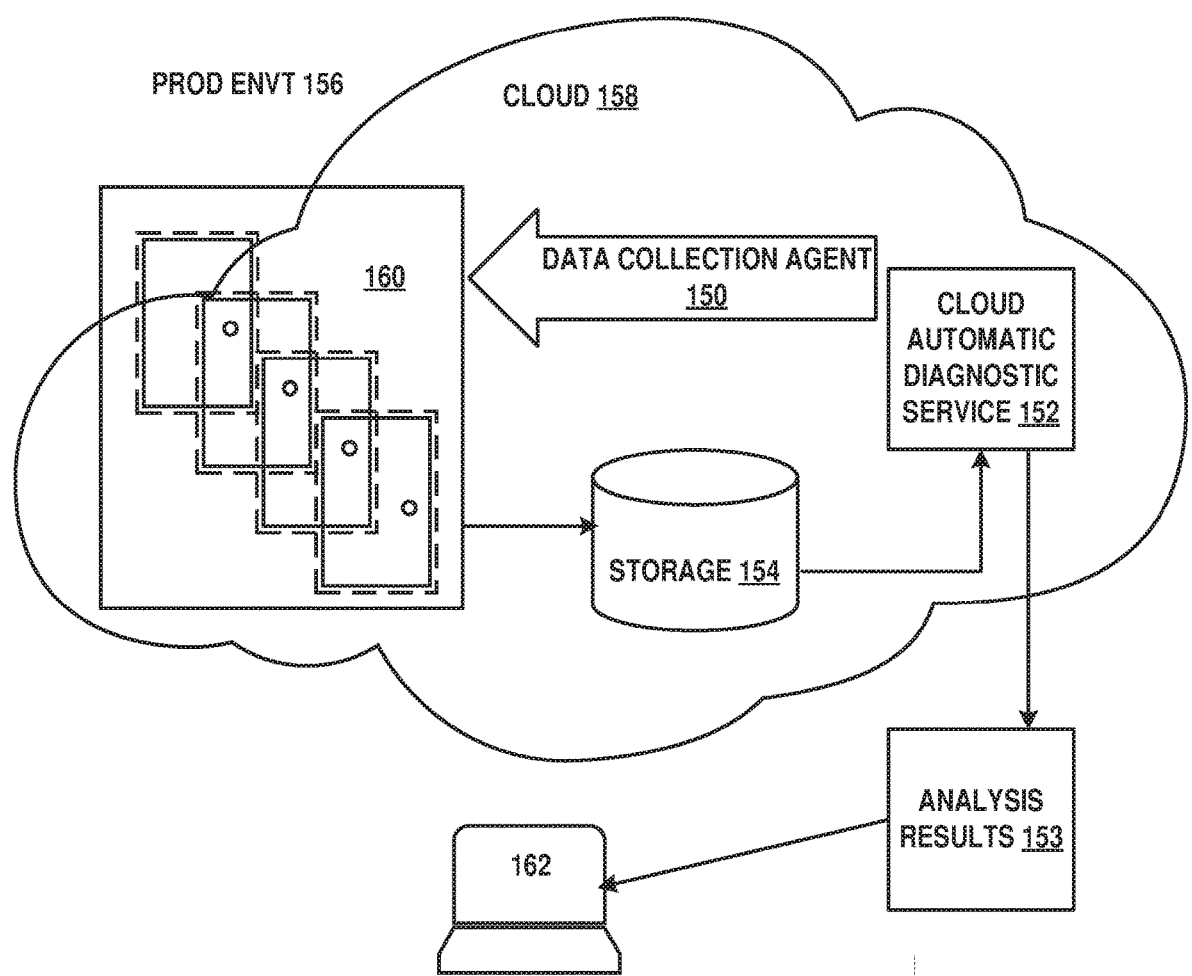
FIG. 1c illustrates a system 103 comprising an example of a cloud automated performance debugging system for production applications in accordance with aspects of the subject matter described herein.

FIG. 1c illustrates a system 103 comprising an example of a cloud automated performance debugging system for production applications in accordance with aspects of the subject matter described herein. All or portions of system 103 may reside on one or more computers or computing devices such as the computers described below with respect to FIG. 3. System 103 or portions thereof may be provided as a stand-alone system or as a plug-in or add-in.

System 103 or portions thereof may include information obtained from a service (e.g., in the cloud) or may operate in a cloud computing environment. A cloud computing environment can be an environment in which computing services are not owned but are provided on demand. For example, information may reside on multiple devices in a networked cloud and/or data can be stored on multiple devices within the cloud.

Contemplated computing devices include but are not limited to desktop computers, tablet computers, laptop computers, notebook computers, personal digital assistants, smart phones, cellular telephones, mobile telephones, sensors, server computers and so on. A computing device such as computing device can include one or more processors and a memory that communicates with the one or more processors.

System 103 can include one or more cloud computing devices such as, for example, computing devices in a data center 160. A cloud data collection agent 150 can collect data from a production environment 156 in the cloud 158 and can serialize the data (e.g., key performance data) to cloud storage 154. A cloud automatic diagnostic service 152 can provide analysis results 153 to a client 162.

FIG. 2a illustrates an example of a method 200 for performance debugging of production applications in accordance with aspects of the subject matter disclosed herein. The method described in FIG. 2a can be practiced by a system such as but not limited to the one described with respect to FIG. 1a and/or FIG. 1b and/or FIG. 1c. While method 200 describes a series of operations that are performed in a sequence, it is to be understood that method 200 is not limited by the order of the sequence depicted. For instance, some operations may occur in a different order than that described. In addition, one operation may occur concurrently with another operation. In some instances, not all operations described are performed. In some instances, not all operations performed are illustrated.

At operation 202 data can be collected. The data can be key performance data. The data can be collected by a data collection agent. The data can be collected by a thread injected into an application process. The data can be collected using a lightweight sampling technique described more fully above. At operation 204 data can be streamed to storage. The data can be streamed to storage so that the analysis of the data can be performed off line. The data can be serialized before it is stored. At operation 206 the stored data can be analyzed. The analysis can be performed off line. The key performance data can be analyzed to identify critical threads. Critical threads can be identified using a decision tree based model. At operation 208 the call stack patterns of the critical threads can be analyzed using a call graph prefix binary tree. At operation 208a analysis results can be provided. The analysis results can be results comprising one or more of: a CPU utilization view, a listing of critical thread data, and/or a call stack pattern view. The analysis results can be provided visually.

FIG. 2b is a block diagram illustrating an automated performance debugging system in accordance with aspects of the subject matter described herein. All or portions of system 210 may reside on one or more computers or computing devices such as the computers described below with respect to FIG. 3. System 210 or portions thereof may be provided as a stand-alone system or as a plug-in or add-in.

System 210 or portions thereof may include information obtained from a service (e.g., in the cloud) or may operate in a cloud computing environment. A cloud computing environment can be an environment in which computing services are not owned but are provided on demand. For example, information may reside on multiple devices in a networked cloud and/or data can be stored on multiple devices within the cloud.

System 210 can include one or more computing devices. Contemplated computing devices include but are not limited to desktop computers, tablet computers, laptop computers, notebook computers, personal digital assistants, smart phones, cellular telephones, mobile telephones, sensors, server computers and so on. A computing device can include one or more processors and a memory that communicates with the one or more processors.

System 210 may include one or more program modules that when loaded into the memory and accessed by the one or more processors cause the processor to perform the action or actions attributed to the one or more program modules. The processor(s) may be configured to perform the action or actions attributed to the one or more program modules. System 210 may operate as follows. One or more worker threads such as worker thread 211 from worker thread pool 209 can be assigned to application process 205. A thread such as injected thread 215 can be injected into a data collection process 213. A data collection agent can collect data such as key performance data 214a from the application process 205 being debugged or tuned. A lightweight sampling process such as lightweight sampling process 207 can be used to collect samples of data. The collected data (e.g., key performance data 214a) can be stored in a storage device such as storage 217. An analysis agent such as analysis agent 221 within a computing process such as computing process 219 can retrieve and/or analyze data such as key performance data 214b in storage 217 to generate analysis results such as analysis results 223.

A worker thread from the worker thread pool can be injected into the data collection process. The lightweight sampling process can periodically collect data which can be serialized and stored in storage. A data analysis process can analyze the data and provide analysis results on a display or other device.

Figure 2F:
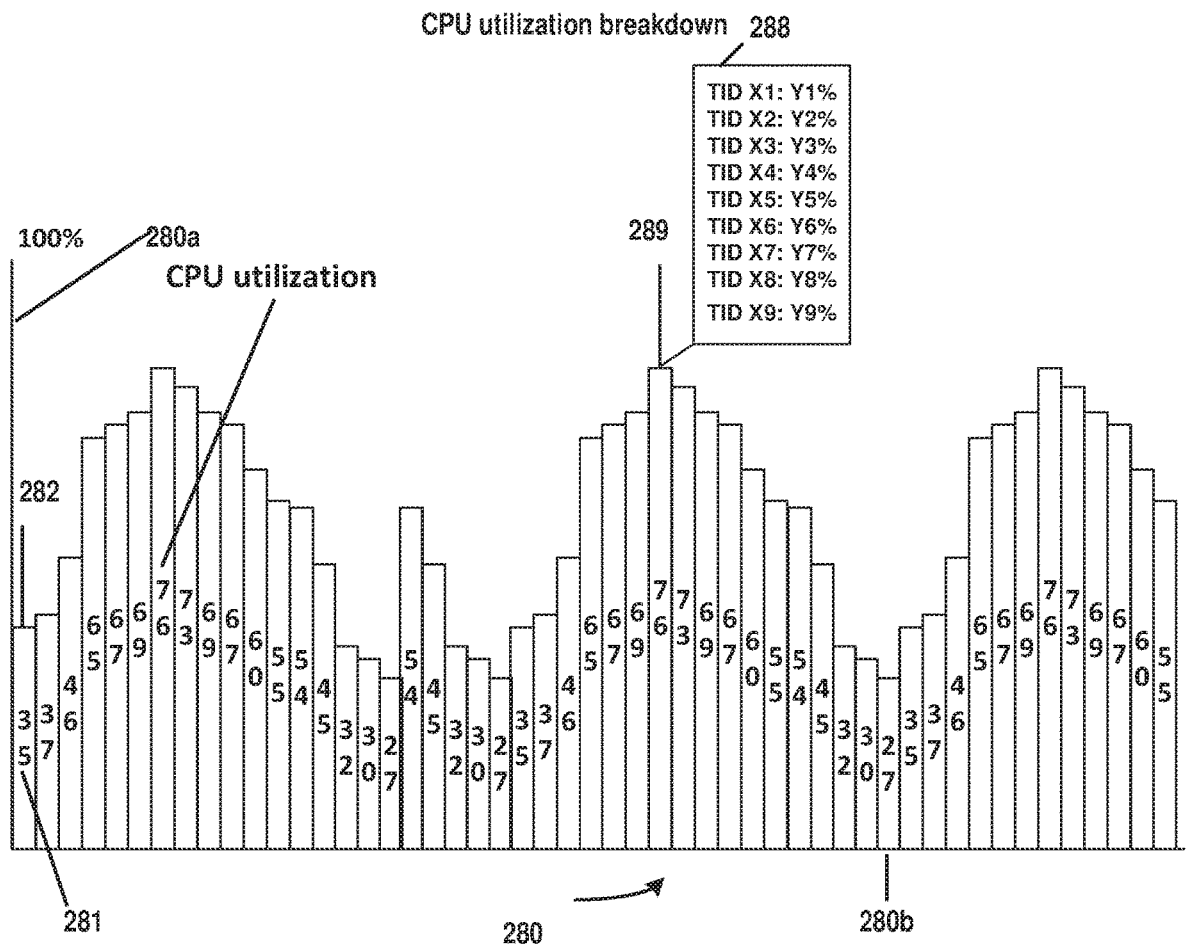
FIG. 2f illustrates an example of analysis results for performance debugging of production applications in accordance with aspects of the subject matter described herein.
Figure 2F:
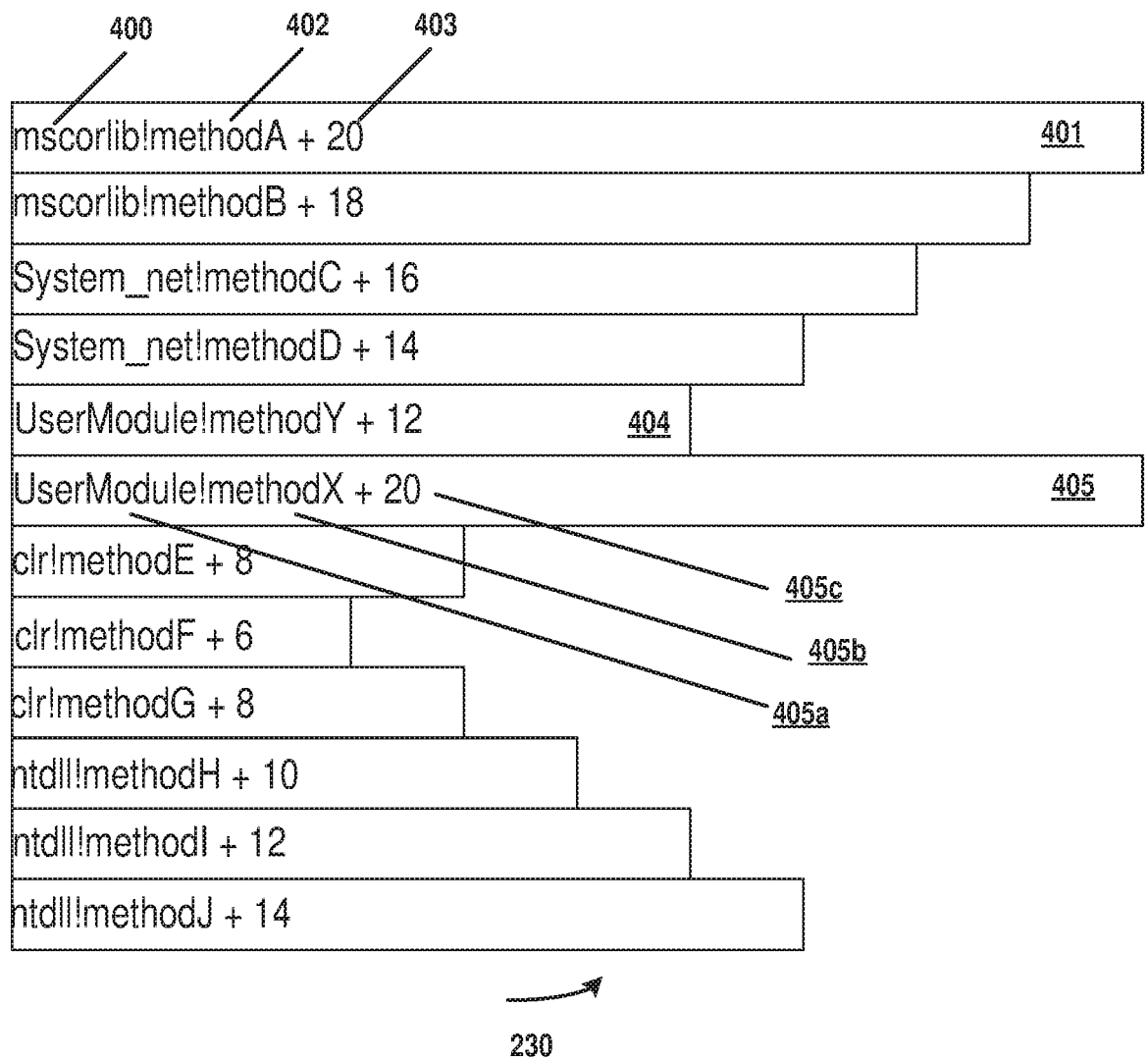

FIG. 2f illustrates an example of elements that can be included in analysis results for performance debugging in accordance with aspects of the subject matter described herein. Chart 280 is an example of a CPU view. The CPU view shows the overall user mode CPU utilization of the computing device. The y axis 280a represents the percentage of user mode CPU utilization. The x axis 280b represents sampling time intervals. Each vertical box in chart 280 refers to user mode CPU utilization from sample $T_{x-1}$ to $T_x$. The CPU view can show the amount of CPU utilization each thread accounts for. For example, "35" 281 in the first vertical box 282 indicates that the total user mode CPU utilization of all threads in the time interval from Sample 0 to Sample 1 is 35%. By selecting a vertical box, the breakdown of user mode CPU utilization can be displayed. The chart of CPU utilization breakdown 288 is a list that shows which thread accounts for how much user mode CPU utilization for that sampling interval. For example, vertical box 289 has a total user mode CPU utilization of 76% and there are 9 contributors (threads), e.g., Thread identifier (TID) X1, Thread X2, Thread X3 . . . to Thread X9. Each thread is associated with a percentage of user mode CPU utilization. For example Thread X1 has CPU utilization of Y1%, Thread X2 accounts for Y2% of CPU user mode utilization etc., to Y9% for Thread X9, respectively. The sum of Y1, Y2 . . . to Y9 is the total user mode CPU utilization, 76 percent. CPU view (chart 280) can depict busy threads at each time interval during the sampling period. Busy threads ranking can be computed. Busy threads ranking along with the other three attributes "Call Stack Length", "Has non-framework call sites" and "Has non-framework call sites in consecutive samples" can be fed into a decision tree model to create Critical Threads View chart 220.

Chart 220 is an example of a view of critical threads. The Critical Threads View, chart 220 depicts the identified critical threads and information about the critical threads including thread ID, column 283, CPU utilization, column 284, e.g. 45% 284a, if it's blocking, column 285, when the thread is sampled, column 286, (Entry 286a 1,7,9,12 means that the thread X1 was sampled from the first to seventh sampling time interval and from the 9th to 12th sampling time interval. In all for entry 286a there are 6 (1 to 7) plus 3 (9 to 12) or 9 sampling intervals. Column 287 is the total sampled time. In this example, each interval is assumed to be a half second, thus column 287 entry 287a indicates a total sampling time of 4.5 seconds, (9 sampling intervals of ½ second each equals 4.5 seconds). Given a sampling interval of one second and a sampling duration of 10 seconds, 11 samples will be taken at Time 0, Time 1 . . . to Time 10.

Chart 230 is an example of a portion of a Call Stack Pattern View for a selected critical thread from a critical thread list such as the critical thread list, chart 220. The complete Call Stack Pattern view depicts all the call stack patterns constructed for the critical thread. Each critical thread has a corresponding Call Stack Pattern View which includes multiple call stack patterns. As described above, in accordance with aspects of the subject matter described herein, a busy threads ranking and decision tree classification can result in a critical threads list. Each thread in the critical threads list can have a call stack pattern view. A critical thread of interest from the CPU utilization breakdown chart (e.g., CPU utilization breakdown chart 288 of chart 280 The view can include one or more clustered call stack patterns. Each call stack pattern can be clustered from multiple call stacks captured during monitoring duration. They can be clustered using Call Graph Prefix Binary Tree data structure and algorithm. This enables a user to focus on the highlighted call sites because the highlighted call sites are the causes of the performance anomaly.

Each call stack pattern can have multiple call stack frames, each of which can include module and method name and the maximum consecutive samples in which it is found. For example, in the partial call stack pattern view, chart 230, mscorlib 400 in the top call stack frame 401 is a module having a method, method A 402. The "20" in call stack frame 401 represents the maximum consecutive samples in which mscorlib!methodA is found. If each sampling has a duration of 1 second, mscorlib!methodA would have executed for 20 seconds. All of the code represented in the chart 230 except for call stack frames 404 and 405 are framework or operating system code (discernible from the module names). The code represented by call stack frames 404 and 405 is user code, discernible because the module name is "UserModule". The call stack frame 405 is a user module 405a with method X 405b and 20 maximum consecutive samples (MCS) 405c. This call stack frame may be distinguished in some way (e.g., highlighting, coloring of text, etc.) to draw attention to it as a possible candidate for causing a performance problem e.g., (being a hotspot). Call stack frame 404 is also relevant because it is user code and has a relatively large MCS. Thus a user can review the code of methodX (and potentially method Y) to determine the reasons for the large MCS.

The implementation of a Call Graph Binary Tree and the algorithm can include a field that records the maximum consecutive samples (e.g., maximum consecutive samples 403) where the call stack frame appears. A coarse calculation of execution time of each call stack frame can be conducted based on maximum consecutive samples. The Call Graph Binary Tree can include a field that records the maximum consecutive samples where the call stack frame appears. In call stack frame 405 it can be seen that in UserModule 406, methodX 407 is present in 20 consecutive samples. From the three types of views, the root cause of the performance related issue can be identified. The analysis flow in accordance with some aspects of the subject matter described herein is as follows:

The CPU view shows busy threads ranking.
The decision tree based model identifies the critical threads.
The call stack pattern view shows hot spots and hot paths of each critical thread.
Thus, it can be determined that one or more threads (e.g., threads a, b and c) have one or more hot spots (e.g., thread a has hotspots a1 and a2, thread b has hotspots b1, b2, b3 and thread c has hot spot c1 hot spots). Thus the hot paths that lead to the performance anomaly in time duration Ta–Tb and Tb–Tc.

Multiple time durations are possible because a user may monitor a process for a long time, during which different performance related issues with different causes could happen at different periods of time. Moreover, the same performance issues could be experienced on different threads at different time periods. Described herein is a computing device comprising a processor and a memory connected to the processor. The processor can be configured to provide a program module that collects key performance data for an application executing in a production environment using a lightweight sampling strategy. It can analyze the key performance data to identify a critical thread. It can analyze a call stack pattern of the critical thread. It can provide analysis results comprising debug information for the application executing in the production environment. The key performance data can include data from execution of the application. The lightweight sampling strategy can inject a data collection agent into a process executing the application, employing use of a thread injected into the process. The key performance data can be fed into a decision tree model to identify critical threads, the critical threads running call sites causing a performance slowdown of the application. Busy threads between any two points in time within a sampling duration can be determined by ranking busy threads. Described herein is a method comprising configuring a processor of a computing device to receive key performance data for automated debugging of a production application, analyze the key performance data to identify a critical thread, the critical thread comprising a thread running a call site, the call site causing a performance slowdown of the production application, analyze a call stack pattern of the critical thread using a call graph prefix binary tree; and provide analysis results. Busy threads between any two points in time within a sampling duration can be identified by ranking busy threads. A critical thread can be identified using a model based on a decision tree. A call stack pattern of the critical thread can be identified using a call graph prefix binary tree. Key performance data can be collected using a lightweight sampling comprising creating a handle to a process in which the production application executes, injecting a thread into the process, injecting a data collection agent into the process to collect the key performance data. Described is a computing device comprising a processor; a memory; the memory connected to the processor; the processor configured to receive key performance data for automated debugging of a production application, analyze the key performance data to identify a critical thread; analyze a call stack pattern of the critical thread using a call graph binary tree; and provide analysis results identifying a call site associated with a performance slowdown. The processor can be further configured to identify the critical thread using a decision tree based model, the critical thread comprising a thread running a call site, the call site causing a performance slowdown of the production application. A CPU utilization view displaying a busy threads ranking can be provided. A call stack pattern view that identifies hot spots can be provided. The processor can be further configured to provide critical thread data.

Example of a Suitable Computing Environment

Figure 3:
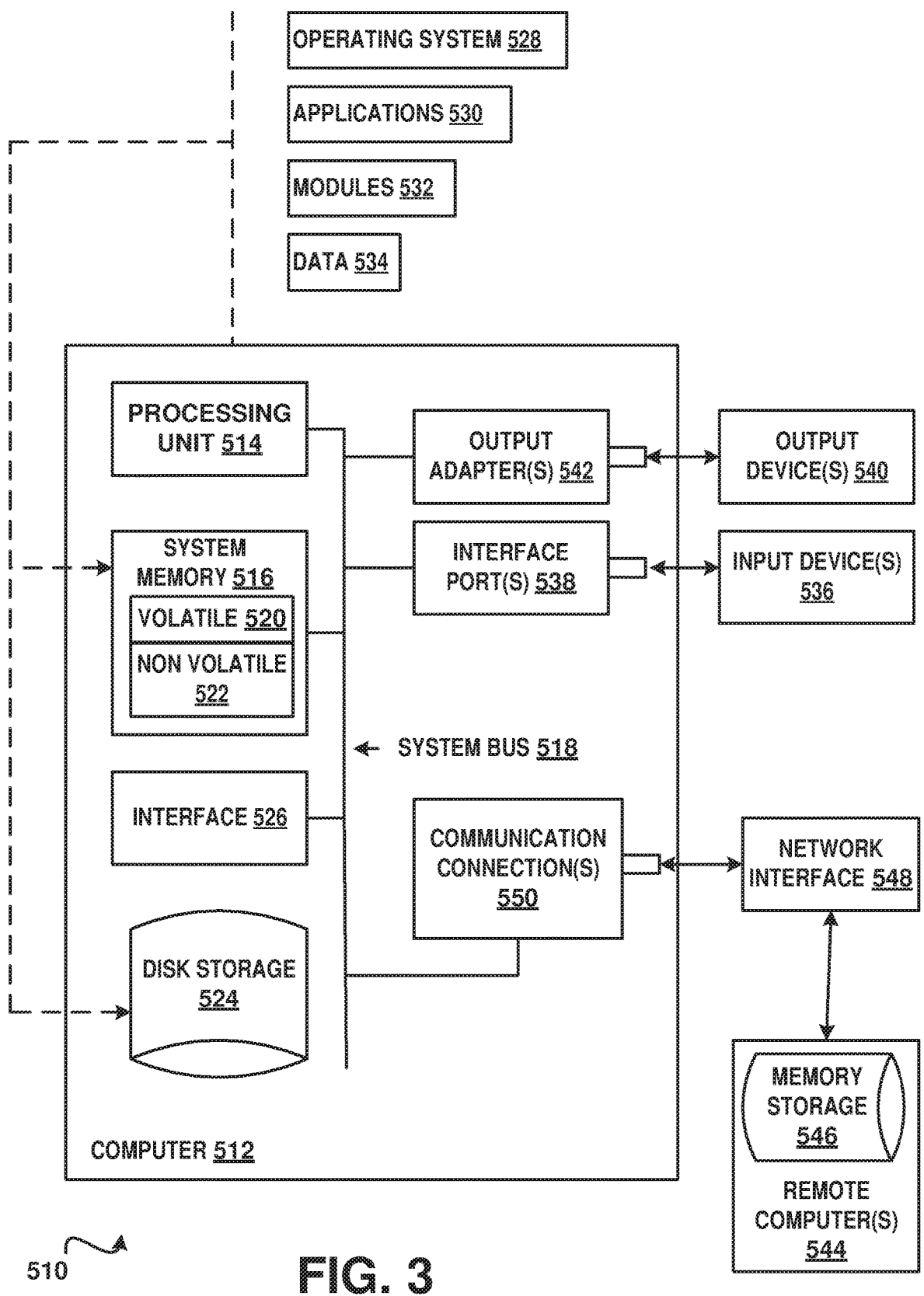
FIG. 3 is a block diagram of an example of a computing environment in accordance with aspects of the subject matter described herein.

In order to provide context for various aspects of the subject matter disclosed herein, FIG. 3 and the following discussion are intended to provide a brief general description of a suitable computing environment 510 in which various embodiments of the subject matter disclosed herein may be implemented. While the subject matter disclosed herein is described in the general context of computer-executable instructions, such as program modules, executed by one or more computers or other computing devices, those skilled in the art will recognize that portions of the subject matter disclosed herein can also be implemented in combination with other program modules and/or a combination of hardware and software. Generally, program modules include routines, programs, objects, physical artifacts, data structures, etc. that perform particular tasks or implement particular data types. Typically, the functionality of the program modules may be combined or distributed as desired in various embodiments. The computing environment 510 is only one example of a suitable operating environment and is not intended to limit the scope of use or functionality of the subject matter disclosed herein.

With reference to FIG. 3, a computing device in the form of a computer 512 is described. Computer 512 may include at least one processing unit 514, a system memory 516, and a system bus 518. The at least one processing unit 514 can execute instructions that are stored in a memory such as but not limited to system memory 516. The processing unit 514 can be any of various available processors. For example, the processing unit 514 can be a graphics processing unit (GPU). The instructions can be instructions for implementing functionality carried out by one or more components or modules discussed above or instructions for implementing one or more of the methods described above. Dual microprocessors and other multiprocessor architectures also can be employed as the processing unit 514. The computer 512 may be used in a system that supports rendering graphics on a display screen. In another example, at least a portion of the computing device can be used in a system that comprises a graphical processing unit. The system memory 516 may include volatile memory 520 and nonvolatile memory 522. Nonvolatile memory 522 can include read only memory (ROM), programmable ROM (PROM), electrically programmable ROM (EPROM) or flash memory. Volatile memory 520 may include random access memory (RAM) which may act as external cache memory. The system bus 518 couples system physical artifacts including the system memory 516 to the processing unit 514. The system bus 518 can be any of several types including a memory bus, memory controller, peripheral bus, external bus, or local bus and may use any variety of available bus architectures. Computer 512 may include a data store accessible by the processing unit 514 by way of the system bus 518. The data store may include executable instructions. 3D models, materials, textures and so on for graphics rendering.

Computer 512 typically includes a variety of computer readable media such as volatile and nonvolatile media, removable and non-removable media. Computer readable media may be implemented in any method or technology for storage of information such as computer readable instructions, data structures, program modules or other data. Computer readable media include computer-readable storage media (also referred to as computer storage media) and communications media. Computer storage media includes physical (tangible) media, such as but not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices that can store the desired data and which can be accessed by computer 512. Communications media include media such as, but not limited to, communications signals, modulated carrier waves or any other intangible media which can be used to communicate the desired information and which can be accessed by computer 512.

It will be appreciated that FIG. 3 describes software that can act as an intermediary between users and computer resources. This software may include an operating system 528 which can be stored on disk storage 524, and which can allocate resources of the computer 512. Disk storage 524 may be a hard disk drive connected to the system bus 518 through a non-removable memory interface such as interface 526. System applications 530 take advantage of the management of resources by operating system 528 through program modules 532 and program data 534 stored either in system memory 516 or on disk storage 524. It will be appreciated that computers can be implemented with various operating systems or combinations of operating systems.

A user can enter commands or information into the computer 512 through an input device(s) 536. Input devices 536 include but are not limited to a pointing device such as a mouse, trackball, stylus, touch pad, keyboard, microphone, voice recognition and gesture recognition systems and the like. These and other input devices connect to the processing unit 514 through the system bus 518 via interface port(s) 538. An interface port(s) 538 may represent a serial port, parallel port, universal serial bus (USB) and the like. Output devices(s) 540 may use the same type of ports as do the input devices. Output adapter 542 is provided to illustrate that there are some output devices 540 like monitors, speakers and printers that require particular adapters. Output adapters 542 include but are not limited to video and sound cards that provide a connection between the output device 540 and the system bus 518. Other devices and/or systems or devices such as remote computer(s) 544 may provide both input and output capabilities.

Computer 512 can operate in a networked environment using logical connections to one or more remote computers, such as a remote computer(s) 544. The remote computer 544 can be a personal computer, a server, a router, a network PC, a peer device or other common network node, and typically includes many or all of the elements described above relative to the computer 512, although only a memory storage device 546 has been illustrated in FIG. 3. Remote computer(s) 544 can be logically connected via communication connection(s) 550. Network interface 548 encompasses communication networks such as local area networks (LANs) and wide area networks (WANs) but may also include other networks. Communication connection(s) 550 refers to the hardware/software employed to connect the network interface 548 to the bus 518. Communication connection(s) 550 may be internal to or external to computer 512 and include internal and external technologies such as modems (telephone, cable, DSL and wireless) and ISDN adapters, Ethernet cards and so on.

It will be appreciated that the network connections shown are examples only and other means of establishing a communications link between the computers may be used. One of ordinary skill in the art can appreciate that a computer 512 or other client device can be deployed as part of a computer network. In this regard, the subject matter disclosed herein may pertain to any computer system having any number of memory or storage units, and any number of applications and processes occurring across any number of storage units or volumes. Aspects of the subject matter disclosed herein may apply to an environment with server computers and client computers deployed in a network environment, having remote or local storage. Aspects of the subject matter disclosed herein may also apply to a standalone computing device, having programming language functionality, interpretation and execution capabilities.

The various techniques described herein may be implemented in connection with hardware or software or, where appropriate, with a combination of both. Thus, the methods and apparatus described herein, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing aspects of the subject matter disclosed herein. As used herein, the term "machine-readable storage medium" shall be taken to exclude any mechanism that provides (i.e., stores and/or transmits) any form of propagated signals. In the case of program code execution on programmable computers, the computing device will generally include a processor, a storage medium readable by the processor (including volatile and non-volatile memory and/or storage elements), at least one input device, and at least one output device. One or more programs that may utilize the creation and/or implementation of domain-specific programming models aspects, e.g., through the use of a data processing API or the like, may be implemented in a high level procedural or object oriented programming language to communicate with a computer system. However, the program(s) can be implemented in assembly or machine language, if desired. In any case, the language may be a compiled or interpreted language, and combined with hardware implementations.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A computing device comprising:
   a processor; and
   a memory connected to the processor; the processor configured to:
   provide a program module that collects key performance data for an application executing in a production environment using a lightweight sampling strategy;
   using a trained machine learning model, analyze the key performance data to identify a particular critical thread of the application, wherein the trained machine learning model has been trained using training cases to designate threads as critical or normal based at least on a corresponding likelihood that the threads have call stack information relating to causes of performance anomalies;
analyze a call stack pattern of the particular critical thread; and
provide analysis results comprising debug information for the application executing in the production environment.

2. The computing device of claim 1, wherein the key performance data comprises data from execution of the application.

3. The computing device of claim 1, wherein the lightweight sampling strategy comprises injecting a data collection agent into a process executing the application.

4. The computing device of claim 1, wherein the trained machine learning model comprises a decision tree model, and the processor is further configured to:
feed the key performance data into the decision tree model to identify a plurality of critical threads of the application, individual critical threads running call sites causing a performance slowdown of the application.

5. The computing device of claim 1, wherein the processor is further configured to:
identify busy threads between any two points in time within a sampling duration; and
input the key performance data for the busy threads to the trained machine learning model.

6. The computing device of claim 1, wherein the processor is further configured to:
perform a ranking of a plurality of busy threads of the application,
wherein the ranking of the plurality of busy threads is used by the trained machine learning model to distinguish the particular critical thread from a normal thread of the application.

7. The computing device of claim 1, wherein the processor is further configured to:
determine respective call stack lengths of multiple threads of the application,
wherein respective call stack lengths are used by the trained machine learning model to distinguish the particular critical thread from a normal thread of the application.

8. The computing device of claim 1, wherein the processor is further configured to:
determine whether multiple threads of the application include non-framework call sites,
wherein the presence or absence of non-framework call sites is used by the trained machine learning model to distinguish the particular critical thread from a normal thread of the application.

9. The computing device of claim 8, wherein the particular critical thread starts and ends with framework call sites and has a non-framework call site in between the framework call sites.

10. The computing device of claim 1, wherein the processor is further configured to:
determine whether multiple threads of the application include non-framework call sites in consecutive samples,
wherein the presence or absence of non-framework call sites in the consecutive samples is used by the trained machine learning model to distinguish the particular critical thread from a normal thread of the application.

11. A method comprising configuring a processor of a computing device to:
receive key performance data for automated debugging of a production application;
analyze the key performance data to identify a critical thread, the critical thread a plurality of call sites, at least one of the plurality of call sites causing a performance slowdown of the production application;
perform an analysis of the critical thread using a call graph prefix binary tree reflecting call stack patterns of the critical thread with respect to the plurality of call sites; and
provide analysis results, the analysis results reflecting the analysis of the critical thread.

12. The method of claim 11, further comprising configuring the processor to:
identify busy threads between any two points in time within a sampling duration; and
select the critical thread based at least on a ranking of the busy threads.

13. The method of claim 11, further comprising configuring the processor to:
identify the critical thread using a decision tree model trained to distinguish critical from non-critical threads.

14. The method of claim 13, further comprising configuring the processor to:
train the decision tree model using an existing set of training cases.

15. The method of claim 11, further comprising configuring the processor to:
collect the key performance data using a lightweight sampling technique comprising:
create a handle to a process in which the production application executes,
inject a thread into the process,
inject a data collection agent into the process to collect the key performance data.

16. A computing device comprising:
a processor; and
a memory;
the memory connected to the processor; the processor configured to:
receive key performance data for automated debugging of a production application;
analyze the key performance data to identify a critical thread having a plurality of call sites;
perform an analysis of the critical thread using a call graph tree reflecting call stack patterns of the critical thread with respect to the plurality of call sites, the call graph tree having nodes representing individual call sites of the critical thread; and
based at least on the analysis, provide analysis results identifying a particular call site of the production application associated with a performance slowdown.

17. The computing device of claim 16, the processor further configured to:
identify the critical thread using a decision tree based model.

18. The computing device of claim 16, the processor further configured to:
provide a CPU utilization view displaying a busy threads ranking.

19. The computing device of claim 16, the processor further configured to:
provide a call stack pattern view that identifies a hot spot in the production application where the performance slowdown occurs.

20. The computing device of claim 16, the processor further configured to:

output critical thread data for the critical thread.

\* \* \* \* \*